United States Patent [19]
Ishizuka et al.

[11] Patent Number: 5,653,541
[45] Date of Patent: Aug. 5, 1997

[54] DISK DRIVING MOTOR

[75] Inventors: Yutaka Ishizuka; Shinji Kinoshita, both of Nagano, Japan

[73] Assignee: Kabushiki Kaisha Sankyo Seiki Seisakusho, Nagano, Japan

[21] Appl. No.: 518,489

[22] Filed: Aug. 15, 1995

[30] Foreign Application Priority Data

Aug. 17, 1994 [JP] Japan .................. 6-193442

[51] Int. Cl.$^6$ .................................. F16C 33/82
[52] U.S. Cl. ................. 384/478; 384/133; 384/477
[58] Field of Search ........................ 384/477, 480, 384/488, 504, 478, 133, 132, 537, 543, 544

[56] References Cited

U.S. PATENT DOCUMENTS

| | | | |
|---|---|---|---|
| 4,824,122 | 4/1989 | Raj et al. | 384/133 X |
| 4,898,480 | 2/1990 | Raj et al. | 384/478 X |
| 4,907,897 | 3/1990 | Shirotori | 384/478 X |
| 5,411,338 | 5/1995 | Goto | 384/537 |

FOREIGN PATENT DOCUMENTS 7-111024  4/1995  Japan .

*Primary Examiner*—Thomas R. Hannon
*Attorney, Agent, or Firm*—Sughrue, Mion, Zinn, Macpeak & Seas

[57] ABSTRACT

A magnetic disk driving device includes a frame which supports a shaft, a hub adapted to hold a disk, and upper and lower bearings which are fitted in a bearing holding hole and rotatably support the hub. The frame includes a cylindrical protrusion which is confronted through a small gap d with the outer cylindrical surface of the outer race of the lower bearing. The small gap d forms a labyrinth in the space through which the inside of the lower bearing is communicated with the outside. The inner cylindrical surface of an annular protrusion formed on the bottom of the hub, and the inner cylindrical surface of the cylindrical protrusion are substantially equal in diameter.

6 Claims, 3 Drawing Sheets

DISK DRIVING MOTOR

BACKGROUND OF THE INVENTION

1. Field of the Invention

This invention relates to the dust-proof seal structure of an electric motor which is adapted to rotate a disk-shaped rotor, and which is applicable to a motor for driving a disk-shaped rotor such as a hard disk and a polygon mirror.

2. Related Art

FIG. 4 shows a dust-proof seal structure of a conventional motor disclosed by Examined Japanese Patent Application NO Sho 4-22297. In the motor, a frame 12 or a washer 18, being coaxial with the lower ball bearing 40, covers part of the lower seal 41 of the lower ball bearing 40, thus forming a labyrinth structure. The air flow effect of the labyrinth structure substantially blocks the flow of dust such as oil mist from the inside of the bearing.

FIG. 5 shows the structure of another example of the conventional disk driving motor. In the motor, a pair of ball bearings 40 and 50 are mounted on a shaft 10 which is secured to a frame 20, to rotatably support a hub 30. The hub 30 has a cylindrical portion 30a which holds the bearing 40. The frame 20 has a cylindrical portion 30a which holds a stator core 70. The outer cylindrical surface of the cylindrical portion 30a and the inner cylindrical surface of the cylindrical portion 30a are confronted with each other through a small gap, thus forming a seal structure.

However, the conventional disk driving motor constructed as shown in FIG. 4 suffers from the following problems: That is, in the motor, it is impossible to completely block the flow of dust which comes from the inside of the ball bearing through the small gap between the lower seal 41 of the lower ball bearing 40 and the frame 12 or the washer 18. This is because air is present in the small gap between the lower seal 41 and the frame 12 or the washer 18, and the dust, being fine, is gasified, thus leaking out together with the air. The labyrinth structure is provided directly for the ball bearing 40. Hence, when the dust flows out of the ball bearing 40, immediately it flows into the external space where a rotor such as a disk is present, and sticks onto the disk, signal reading means, etc., thus adversely affecting them.

The disk driving motor shown in FIG. 5 also involves problems to be solved. That is, in order to allow the motor to have a high dust-proof effect, the gap between the outer cylindrical surface of the cylindrical portion 30a and the inner cylindrical surface of the cylindrical portion 30a must be made extremely small. Hence, those inner and outer cylindrical surfaces must be machined with high accuracy, which is one of the factors which increases the manufacturing cost of the motor. In addition, in the motor, the inside diameter of the cylindrical portion 30a of the hub 30 on the movable side is different from that of the cylindrical portion 20a of the frame 20 on the stationary side. Hence, not only the outside diameter of the motor is unavoidably large, but also the rotation of the hub 30 is adversely affected in balance. Therefore, the ball bearings 40 and 50 produce noises, and the motor is lowered in oscillation characteristic.

SUMMARY OF THE INVENTION

In view of the foregoing, an object of the invention is to provide a disk driving motor in which the flow of dust or the like is blocked which comes from the lower bearing through the small gap, whereby a rotor such as a disk is prevented from being adversely affected thereby.

Another object of the invention is to provide a disk driving motor in which the seal mechanism is formed at low cost, and which is small in size as a whole.

A further object of the invention is to provide a disk driving motor in which its rotor is improved in the balance of rotation, and which is suppressed in the production of noise, and is improved in oscillation characteristic.

Accoring to an aspect of the present invention, there is provided a disk driving motor comprising: a shaft; a frame supporting said shaft; a hub on which a disk is mounted, said hub having a bearing holding hole; and a ball bearing having an inner race mounted on said shaft, and an outer race fixedly fitted in said bearing holding hole of said hub, thus rotatably supporting said hub, said frame includes a protruded annular bank which is confronted through a small gap with the outer cylindrical surface of said outer race of said ball bearing, and the inner cylindrical surface of said protruded annular bank is approximately larger by (2×d) in diameter than the inner cylindrical surface of said bearing holding hole of said hub, where d is the width of said small gap.

As was described above, in the disk driving motor of the invention, the small gap formed between the inner cylindrical surface of the protruded annular bank of the frame and the outer cylindrical surface of the outer race of the lower ball bearing, is utilized to isolate from each other the first space communicated with the inside of the bearing and the second space communicated with outside, so that the flow of dust from the insides of the upper and lower ball bearings is blocked. Furthermore, in the motor of the invention, the inner cylindrical surface of the protruded annular bank of the frame, and the inner cylindrical surface of the bearing holding hole of the hub are substantially equal in diameter to each other with the small gap between them. Hence, the rotation of the rotor with respect to the stator is improved in balance; that is, the motor is improved in oscillation characteristic, and the rotational noise produced by the ball bearings 4 and 5 is decreased. In addition, the motor is decreased in outside diameter; that is, it is reduced in size.

In the motor of the invention, the fluid is present in the small gap, so that the flow of dust from the insides of the upper and lower bearings is positively blocked. That is, the motor is prevented from being adversely affected by the dust.

In the case where a fluorine-based grease is employed as the fluid in the small gap, the fluid is suppressed in volatility. In another example of the motor, the fluid in the small gap is the same as the grease in the ball bearings. The motor is advantageous in that, even if the grease flows into the ball bearing, the latter will never be lowered in lubrication characteristic thereby.

In another example of the disk driving motor of the invention, the frame is of a non-magnetic material, while the outer race of the ball bearing is of a magnetic material, and the magnet unit is arranged around the protruded annular bank of the frame, and the magnetic fluid is present in the small gap between the outer cylindrical surface of the outer race of the ball bearing and the inner cylindrical surface of the protruded annular bank. Hence, the first space communicated with the inside of the ball bearing, and the second space communicated with outside are more positively isolated from each other; that is, the flow of dust from the ball bearing is positively blocked.

DETAILED DESCRIPTION OF THE PREFERRED EMBODIMENTS

Preferred embodiments of the invention will be described with reference to FIGS. 1 through 3.

First Embodiment

Figure 1A:
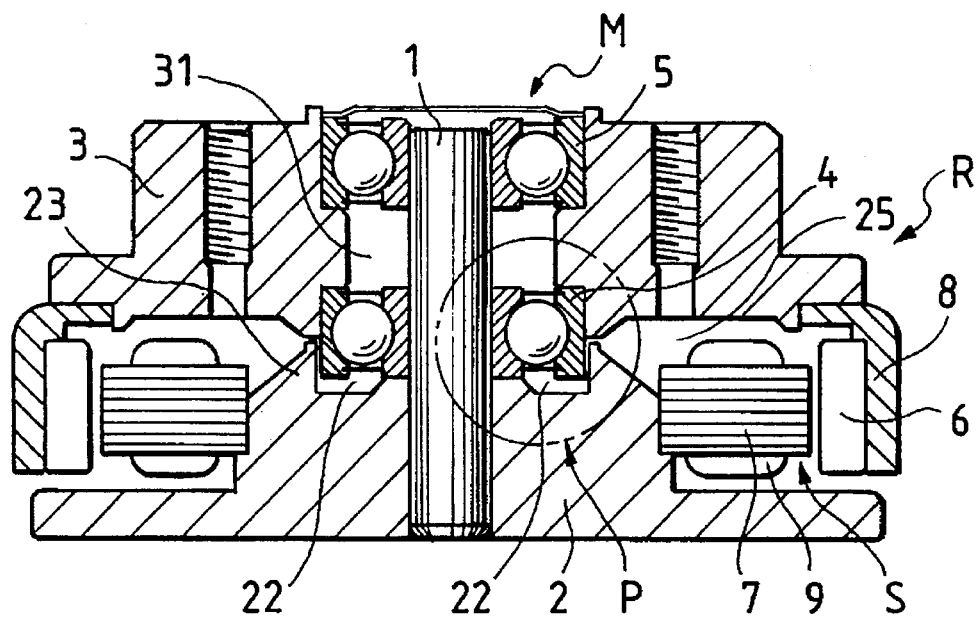
FIG. 1(A) is a sectional view showing essential components of the disk driving motor of a first embodiment of the invention.
Figure 1B:
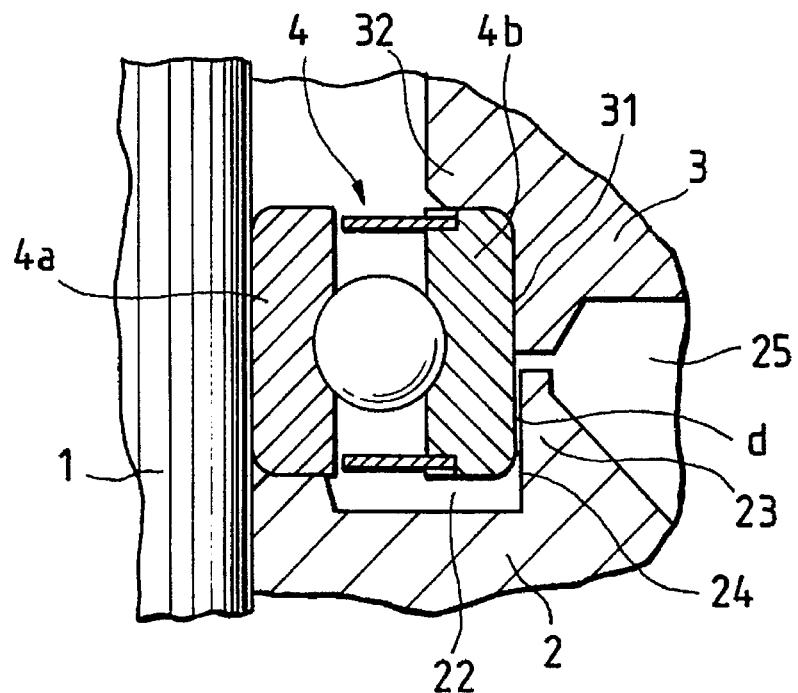
FIG. 1(B) is an enlarged diagram showing the encircled part P in FIG. 1(A)

FIG. 1 shows an example of a disk driving motor, which constitutes a first embodiment of the invention. More specifically, FIG. 1(A) is a sectional view showing essential components of the disk driving motor, and FIG. 1(B) is an enlarged diagram showing the encircled part P in FIG. 1(A).

The motor, as shown in FIG. 1(A), comprises: a shaft 1; a frame 2 in which one end portion of the shaft 1 is fitted, the frame 2 supporting a stator section S; a hub 3 on which a disk is mounted; a yoke 8 of magnetic material which is fixedly mounted on the outer periphery of the hub 3; a drive magnet unit 6 which is fixedly mounted on the inner cylindrical surface of the yoke 8 in such a manner as to confront with the stator section S; and a lower ball bearing 4 and an upper ball bearing 5 which are held in a bearing holding hole 31 formed in the hub 3 at the center.

The hub 3, the yoke 8, and the drive magnet unit 6 form a rotor section R, while a stator core 7 and a coil 9 form the aforementioned stator section S. When the coil 9 is excited with current, the rotor section R is turned through the electromagnetic action of the stator core 7 and the drive magnet unit.

The lower ball bearing 4 is arranged as follows: That is, the inner race 4a of the lower ball bearing 4 is fitted on the shaft 1, and the outer race 4b is held in the bearing holding hole 31 formed in the hub 3. A first space 22 is provided below the lower ball bearing 4 which is defined by the frame 2. The frame 2 includes a protruded annular bank 23 which covers the lower half of the outer cylindrical surface of the outer race 4b of the lower ball bearing 4. A second space 25 is provided outside the protruded annular bank 23 of the frame 2 which is communicated with outside. That is, the protruded band 23 is formed along the border between the first space 22 and the second space 25. As shown in FIG. 1(B), a small gap d is formed between the inner cylindrical surface 24 of the protruded band 23 and the outer cylindrical surface of the outer race 4b of the ball bearing 4.

The upper half of the outer race 4b of the ball bearing 4 is fixedly fitted in the bearing holding hole 31, and the upper end face of the outer race is abutted against the end face of a step 32 which is smaller in diameter than the bearing holding hole 31. As was described above, the lower half of the outer cylindrical surface of the outer race 4b of the ball bearing 4 is confronted with the inner cylindrical surface of the protruded annular bank 23 through the small gap d. The small gap d is located between the first space 25 in which the ball bearing is provided and the second space 22 which is communicated with outside, thus forming a seal mechanism in a labyrinth structure.

As is apparent from FIG. 1(B), the inside diameter of the inner cylindrical surface 24 of the protruded annular bank 23 is larger as much as (2×d) than that of the inner cylindrical surface of the bearing holding hole 31 of the hub 3 (where d is the width of the small gap).

In the embodiment, air is present in the small gap d, and the width of the gap is 0.2 mm or less. The width of the small gap is greatly reduced to about 0.02 mm as the case may be. In order to obtain this extremely small width, it is necessary to severely control the machining accuracy in formation of the two cylindrical surfaces.

Figure 5:
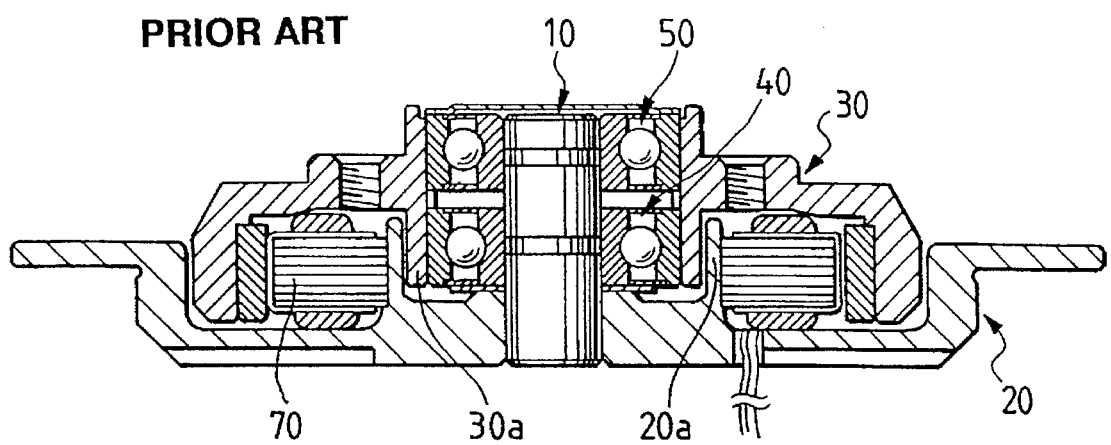
FIG. 5 is a sectional view showing another example of the conventional disk driving motor.

In the case where, as in the case of the conventional motor shown in FIG. 5, the small gap between the inner cylindrical surface of the cylindrical portion 20a of the frame 20 and the outer cylindrical surface of the cylindrical portion 40a of the hub forms the seal mechanism, it is essential to machine the two cylindrical surfaces with high accuracy. If those cylindrical surfaces are low in dimensional accuracy; that is, if the gap is larger in width even at its part, then the dust will flow out through the part; that is, the mechanical seal does not work at all. If, on the contrary, the gap is too small in width, then the two members may be brought into contact with each other even by a small impact applied to the motor, which results in a great rotational loss.

On the other hand, in the motor of the invention, one of the members which form the small gap d is the outer cylindrical surface of the outer race 4b of the ball bearing 4. Since the outer cylindrical surface of the outer race 4b is originally finished with high accuracy, it is unnecessary to machine it again. Thus, the small gap d can be obtained by accurately forming only the inner cylindrical surface 24 of the protruded annular bank 23 by machining.

In the above-described embodiment, as was described before the small gap d is formed between the inner cylindrical surface of the protruded annular bank 23 of the frame 2 and the outer cylindrical surface of the outer race 4b of the lower ball bearing 4. Hence, as the rotor R turns, the outer race 4b of the ball bearing 4 is turned, so that a flow of air is formed in the small gap d. That is, during the rotation of the rotor R, the air pressure in the small gap d is increased, thus isolating the first space 22 and the second space 25 from each other, so that the flow of dust from the inside of the lower ball bearing 4 is blocked.

The inner cylindrical surface 24 of the protruded annular bank 23 and the inner cylindrical surface of the bearing holding hole 31 are substantially equal in diameter to each other with a small gap d between them. Hence, the rotation of the rotor with respect to the stator is improved in balance; that is, the motor is improved in oscillation characteristic. This feature results in effects that the rotational noise produced by the ball bearings 4 and 5 is decreased. In addition, the motor is decreased in outside diameter; that is, it is reduced in size.

Second Embodiment

Figure 2:
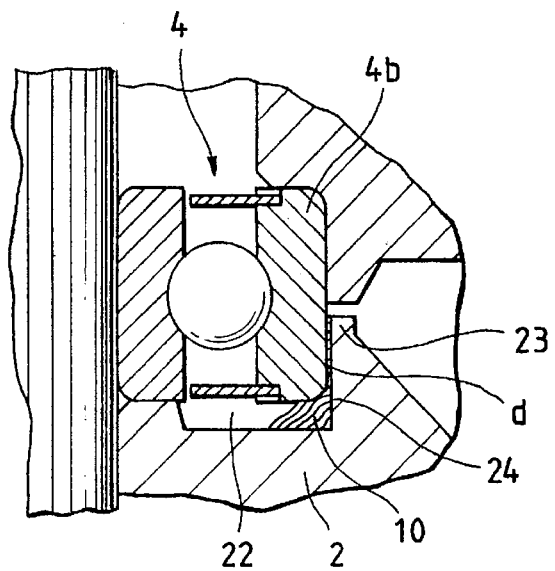
FIG. 2 is an enlarged explanatory diagram showing part of another example of the disk driving motor, which constitutes a second embodiment of the invention.

FIG. 2 is an enlarged diagram showing essential components of another example of the disk driving motor, which constitutes a second embodiment of the invention. In FIG. 2, parts corresponding functionally to those already described with reference to FIG. 1 are therefore similarly designated.

In the second embodiment, as shown in FIG. 2, a liquid-phase fluid 10 is present in the first space 22, and in the small gap d which is formed between the inner cylindrical surface 24 of the protruded annular bank 23 of the frame 2 and the outer cylindrical surface of the outer race 4a of the lower ball bearing 4.

The fluid 10 may be any one which is viscous to some extent, and is hardly gasified, not producing hazardous gas. In FIG. 2, the fluid 10 is present both in the first space 22 and in the gap d; however, it may be present only in the gap d.

The presence of the liquid-phase fluid 10 in the small gap d positively blocks the flow of gas between the first space 22 and the second space 25. That is, the flow of dust from the ball bearings 4 and 5 can be positively blocked.

In the case where the liquid-phase fluid 10 is present in the small gap d, the width of the gap may be 0.2 mm or more. This is because, if the width d is too small, then the fluid provides a great flow resistance, which adversely affects the rotation of the rotor section.

Third Embodiment

Another example of the disk driving motor, which constitutes a third embodiment of the invention (not shown), is different from the second embodiment only in that a fluorine-based grease is employed as the fluid 10. That is, in the third embodiment, the fluid 10 is the one which is suppressed in volatility. Hence, in the third embodiment, the first space 22 communicated with the bearing holding hole 31, and the second space 25 communicated with outside are more positively separated from each other.

Fourth Embodiment

Another example of the disk driving motor, which constitutes a fourth embodiment of the invention (not shown), is different from the second embodiment only in that the material employed as the fluid 10 is equal in quality to the grease which is employed as lubricant in the upper and lower ball bearings 4 and 5 of the second embodiment. Hence, even if the fluid 10 flows into the lower ball bearing 4, the latter will never be lowered in lubrication characteristic thereby; that is, the motor is free from the difficulty that the bearing is lowered in lubrication characteristic because of the difference in quality between greases.

Fifth Embodiment

Figure 3A:
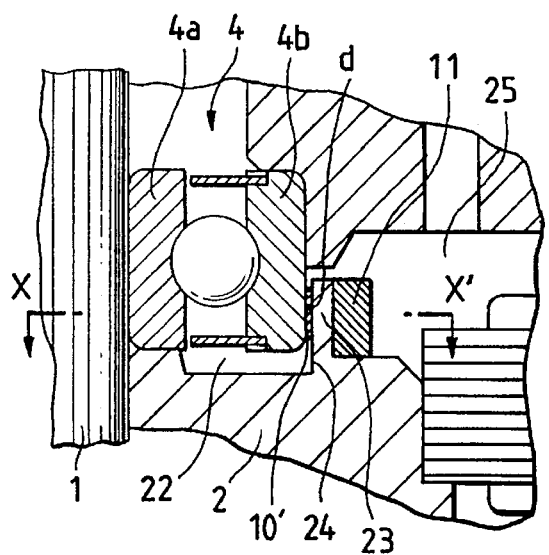
FIG. 3(A) is a vertical sectional view showing essential components of the disk drive motor of a fifth embodiment of the invention PIG. 3(B) is a cross sectional view taken along line X–X' in FIG. 3(A).

FIGS. 3(A) and (B) are enlarged diagrams showing essential components of another example of the disk driving motor, which constitutes a fifth embodiment of the invention. More specifically, FIG. 5(A), is a vertical sectional view, and FIG. 5(B) is a cross sectional view taken along line X–X' in FIG. 5(A). In FIG. 3, parts corresponding functionally to those already described with reference to the first embodiment 1 are therefore similarly designated.

In the fifth embodiment, its frame 2 is made of a non-magnetic material such as aluminum. The frame 2 includes a protruded annular bank 23, and an annular magnet unit 11 is arranged around the protruded annular bank 23. In addition, a magnetic fluid 10' is present in the small gap d which is formed between the outer cylindrical surface of the outer race 4b of the lower ball bearing 4 which is of a ferromagnetic material such as stainless steel, and the inner cylindrical surface of the protruded annular bank 23. In the motor thus constructed, the annular magnet unit 11 and the outer race 4bof the lower ball bearing 4 form a magnetic circuit as shown in FIG. 3(B), so that the magnetic fluid 10' is held in the small gap d at all times, which more positively isolates the first space 22 and the second space 25 from each other.

Figure 3B:
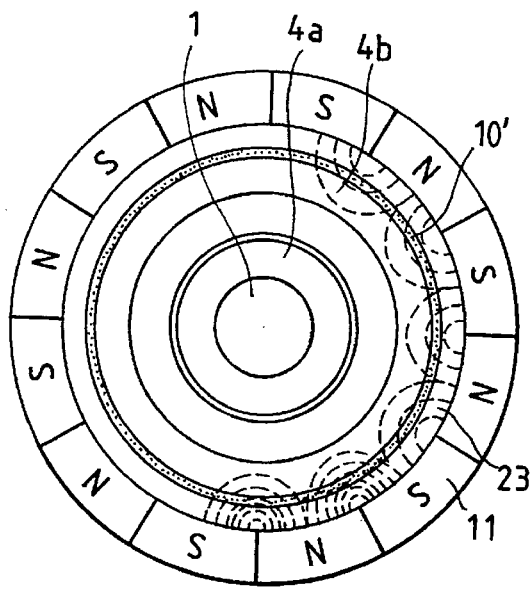
Figure 4:
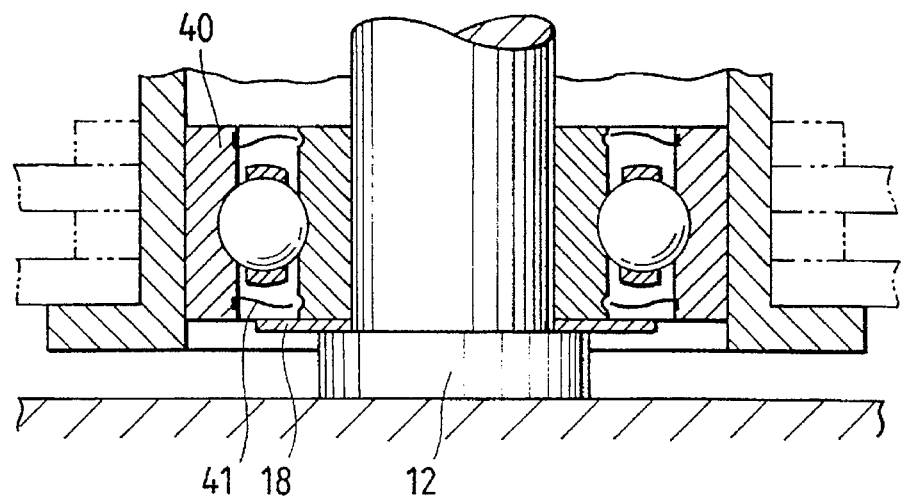
FIG. 4 is a sectional view showing essential components of an example of a conventional disk driving motor.

In FIG. 3(B), the dotted lines are to schematically indicate the magnetic flux outputs of the magnet unit 11.

As was described above, in the disk driving motor of the invention, the small gap formed between the inner cylindrical surface of the protruded annular bank of the frame and the outer cylindrical surface of the outer race of the lower ball bearing, is utilized to isolate from each other the first space communicated with the inside of the bearing and the second space communicated with outside, so that the flow of dust from the insides of the upper and lower ball bearings is blocked. Furthermore, in the motor of the invention, the inner cylindrical surface of the protruded annular bank of the frame, and the inner cylindrical surface of the bearing holding hole of the hub are substantially equal in diameter to each other with the small gap between them. Hence, the rotation of the rotor with respect to the stator is improved in balance; that is, the motor is improved in oscillation characteristic, and the rotational noise produced by the ball bearings 4 and 5 is decreased. In addition, the motor is decreased in outside diameter; that is, it is reduced in size.

In the motor of the invention, the fluid is present in the small gap, so that the flow of dust from the insides of the upper and lower bearings is positively blocked. That is, the motor is prevented from being adversely affected by the dust.

In the case where a fluorine-based grease is employed as the fluid in the small gap, the fluid is suppressed in volatility. In another example of the motor, the fluid in the small gap is the same as the grease in the ball bearings. The motor is advantageous in that, even if the grease flows into the ball bearing, the latter will never be lowered in lubrication characteristic thereby.

In another example of the disk driving motor of the invention, the frame is of a non-magnetic material, while the outer race of the ball bearing is of a magnetic material, and the magnet unit is arranged around the protruded annular bank of the frame, and the magnetic fluid is present in the small gap between the outer cylindrical surface of the outer race of the ball bearing and the inner cylindrical surface of the protruded annular bank. Hence, the first space communicated with the inside of the ball bearing, and the second space communicated with outside are more positively isolated from each other; that is, the flow of dust from the ball bearing is positively blocked.

What is claimed is:

1. A disk driving motor comprising:

a shaft;

a frame supporting said shaft;

a hub on which a disk is mounted, said hub having a bearing holding hole; and a ball bearing having an inner race mounted on said shaft, and an outer race fixedly fitted in said bearing holding hole of said hub, thus rotatably supporting said hub, wherein said frame includes a protruded annular bank which is confronted through a small gap with an outer cylindrical surface of said outer race of said ball bearing, and an inner cylindrical surface of said protruded annular bank is larger in diameter than an inner cylindrical surface of said bearing holding hole of said hub by an amount substantially equal to 2d, where d is the width of said small gap.

2. A disk driving motor as claimed in claim 1, wherein a fluid is present in said small gap.

3. A disk driving motor as claimed in claim 2, wherein said fluid is a gas, and the small gap is 0.2 mm or less in width.

4. A disk driving motor as claimed in claim 2, wherein said fluid includes a fluorine-based grease.

5. A disk driving motor as claimed in claim 2, wherein said fluid includes a grease applied to said ball bearing.

6. A disk driving motor as claimed in claim 2, wherein said outer race of said bearing is made of a magnetic material, said frame is made of a non-magnetic material, a magnet unit is arranged around said protruded annular bank, and a magnetic fluid is present in said small gap.

* * * * *